May 13, 1930.  G. B. VROOM  1,758,725

STUFFING BOX ASSEMBLY

Filed May 28, 1925

Guysbert B. Vroom Inventor

By Robert A. Lavender

Attorney

Patented May 13, 1930

1,758,725

UNITED STATES PATENT OFFICE

GUYSBERT B. VROOM, OF WASHINGTON, DISTRICT OF COLUMBIA, ASSIGNOR TO VROOM ROTARY PACKING CORPORATION, A CORPORATION OF MASSACHUSETTS

STUFFING-BOX ASSEMBLY

Application filed May 28, 1925. Serial No. 33,566.

(GRANTED UNDER THE ACT OF MARCH 3, 1883, AS AMENDED APRIL 30, 1928; 370 O. G. 757)

My invention relates to a stuffing box assembly for use with a rotary shaft, and in particular, to an assembly where steam tight connections are required and high pressure may occur, as in turbines and rotary pumps.

An object of my invention is to provide a stuffing box assembly in which there are no surfaces bearing directly upon the shaft.

Another object is the positive prevention of the leakage of steam or any other substance around the bearing contact surfaces.

Another object is the provision of suitable pressure means for securing a firm contact between the bearing surfaces.

A further object is a construction that is readily adjustable for maintaining correct pressure between the bearing surfaces.

A further object is an assembly having longitudinal movement to permit end motion of the shaft.

An additional object is to provide a construction simple and cheap to manufacture that is readily assembled and disassembled.

Figure 1:
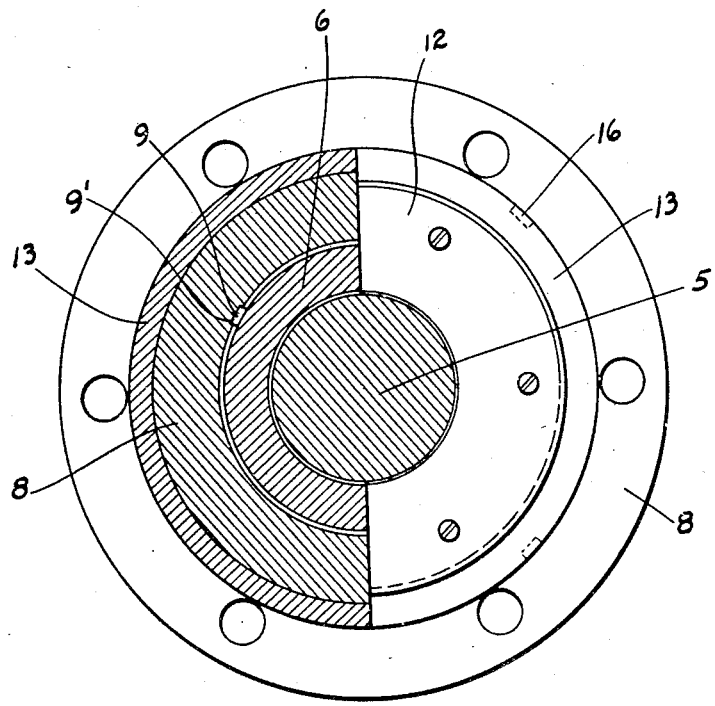
Figure 2:
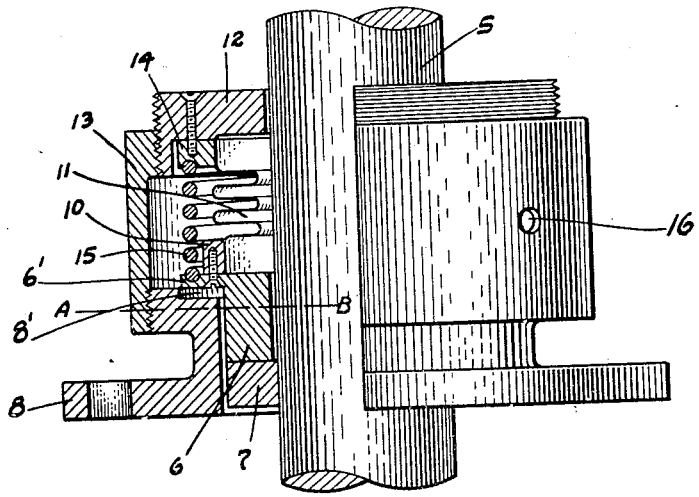

These and other objects will appear from the following description:

Reference is to be had to the accompanying drawings forming part of this specification and in which like reference characters denote corresponding parts throughout the several views, and in which Figure 1 is a half section on the line A—B of Figure 2, and Figure 2 is a cross sectional view of a packing housing showing my invention applied.

Referring more particularly to Figure 2 of the drawings, 5 is a rotating shaft about which a packing ring 6 is placed. This packing ring may be made of carbon, bronze or other suitable material and has a ground surface where it comes in contact with a steel collar or bearing ring 7 that is accurately turned to have a steam tight fit on the shaft and secured from turning thereon by a key or other suitable means.

The ring 6 fits loosely about the shaft and in the bore of a casting or housing 8 adapted to be secured to the power means desired to be packed by my invention. Lugs 9 extending from the ring fit in longitudinal slots 9' in the bore of the housing to permit relative longitudinal movement of said parts and prevent rotary movement of said ring 6 due to its frictional engagement with collar 7 fixed on rotary shaft 5. A clearance 8' is formed in the end of the housing to permit longitudinal movement of a preferably continuous flange 6' formed integral with the ring 6. 10 is a ring of bronze or other desirable material removably secured by a plurality of screws to the flange 6' of the packing ring 6 and to which is steam-tight fastened one end of a flexible bellows like hollow cylinder device 11, surrounding shaft 5 and forming a steam tight joint between said collar 7 and nut 12. The bellows is a corrugated metallic cylinder surrounding the shaft and is sufficiently flexible to permit of free movement of the packing ring to take up for wear between parts 6 and 7 and also to allow for end motion of the shaft.

12 is an adjusting nut free from, but obtaining longitudinal adjustment along the shaft 5 through an adjusting sleeve 13 which has right hand threads at one end and left hand threads on the other, respectively engaging which the threads on one end of the casting 8 and the nut 12, so that turning the sleeve 13 in one direction relatively moves the nut 8 towards the packing ring, and turning it in the opposite direction moves the nut away from the packing. The adjusting nut 12 has removably secured thereto by a plurality of screws a ring 14 to which is steam-tight connected the other end of the tubular bellows 11 forming a steam tight joint between said parts 6 and 12. Pressure between the bearing surfaces of the collar ring 7 and packing 6 is maintained by a compression spring 15 mounted between the flange 6' on the packing 6 and ring 14. The degree of pressure exerted by the ring 6 upon the collar 7, caused by the spring 15, may be regulated by the movement of the adjusting nut 12 through the turning of the sleeve 13, and in such adjustment housing 8 is kept from rotation with sleeve 13 by its aforesaid securement, while nut 12 is prevented from rotation with sleeve 13 by ring 14 secured thereto and to one end of tubular bellows 11 whose opposite end is secured to packing ring 6 which is slidably connected to housing 8 by spline 9 rigid on ring 6 and sliding in slot 9' in housing 8. Recesses 16, Figure 1, are provided in but not extending through the wall of sleeve 13 so that a tool may be inserted to turn the sleeve 13.

The parts are assembled as illustrated in Figure 2 and pressure on the surface between the collar and the packing ring is adjusted by turning the sleeve 13 until leakage through the joint between collar 7 and ring 6 is stopped, after which further adjustments may be made at such intervals as may be necessary to compensate for wear and/or loss of force of spring 15. If renewal of the collar 7 is desired for any reason the casting 8 is removed from the power unit permitting access thereto. Should it be desired to renew packing ring 6, adjusting nut 12 is backed out by rotating the sleeve 13 in the proper direction, and the adjusting nut, bellows and packing ring are withdrawn.

Since the collar or bearing ring 7 is secured to and has a steam tight fit on the shaft 5, and rotates with the shaft a positive leakage preventing means along the shaft is provided. The bellows connection between the packing ring 6 and the housing 8, including the adjusting nut 12 and sleeve 13 forms another positive leakage preventing means from the housing 8 externally of the bearing surfaces. Consequently leakage can only occur between the plane bearing contact surfaces of the rings 6 and 7 and this is prevented by suitably adjusting the pressure upon the packing ring 6.

The pressure of the steam or other medium to be sealed by my device is against the collar 7 and in the peripherical space about collar 7, ring 6, and bellows 11 confined by the bores of housing 8 and sleeve 13 and its only avenue of possible escape therefrom is through the joint between collar 7, ring 6 and the clearance space between nut 12 and shaft 5.

The only wearing surfaces presented by this construction are the contact surfaces of the rings 6 and 7. No necessity therefore arises for grinding or otherwise truing up the shaft.

The construction also permits an end play of the shaft 5, all endwise movements being absorbed by the spring 15 and the metallic bellows 11.

It will be understood that the above description and accompanying drawings comprehend only the general and preferred embodiment of my invention and that various minor changes in details of construction, proportion and arrangement of parts may be made within the scope of the appended claims and without sacrificing any of the advantages of my invention.

The invention herein described may be manufactured and used by or for the Government of the United States for governmental purposes without the payment to me of any royalty thereon or therefor.

Having described my invention what I claim is:

1. A packing gland unit for a shaft comprising a housing, an internally threaded sleeve revolubly carried thereby, an externally threaded adjusting nut carried by the sleeve, a packing assembly non-revolubly carried by the nut, means whereby said assembly is feathered to and free to slide within said housing; the housing sleeve, adjusting nut and packing assembly being each removable from the other, and the packing assembly being removable with the nut from the sleeve.

2. A packing gland unit for a shaft comprising a housing, a sleeve threaded upon the housing, a nut capable of receiving the shaft and threaded into the sleeve, a packing ring having a radially extending flange, a pair of ring members one of which is removably secured to the inner face of the nut and corresponding in diameter to the radial flange on the packing ring, the other of said ring members being secured to the opposing face of the packing ring, a bellows making pressure tight joints with said ring members, and a coil spring interposed between the ring member secured to said nut and the flange of the packing ring, said packing elements being all removable as a unit with the removal of the sleeve.

3. In a packing assembly the combination with a shaft, a member steam-tight thereon and a housing about a portion of said shaft, of a threaded nut surrounding a portion of said shaft, a ring about said shaft and juxtaposed to said member, a tube and a spring about said shaft and extending between said nut and ring; means for preventing the revoluble movement of said nut, ring and tube; and a revoluble sleeve surrounding said spring and ring and engaging said housing and nut near its opposite end with respective right and left hand screw threads.

4. In a packing assembly the combination with a shaft, a member steam-tight thereon and a housing about a portion of said shaft, of a threaded nut surrounding a portion of said shaft, a ring about said shaft and juxtaposed to said member, an expansible bellows tube forming a steam-tight connection between said nut and ring, means for preventing the revoluble movement of said nut, ring and means; and a revoluble sleeve surrounding said spring tube and ring and engaging said housing and nut near its opposite ends with respective right and left hand screw threads.

GUYSBERT B. VROOM.